United States Patent
Young et al.

(10) Patent No.: US 11,749,116 B1
(45) Date of Patent: Sep. 5, 2023

(54) APPARATUS AND METHODS FOR PROVIDING ADAPTIVE VEHICLE PARKING ASSISTANCE BASED ON A DRIVER'S FAMILIARITY WITH A VEHICLE

(71) Applicant: HERE GLOBAL B.V., Eindhoven (NL)

(72) Inventors: Jeremy Michael Young, Chicago, IL (US); Jerome Beaurepaire, Nantes (FR); Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/716,723

(22) Filed: Apr. 8, 2022

(51) Int. Cl.
 *H04N 5/44* (2011.01)
 *G08G 1/16* (2006.01)
 *B60W 50/14* (2020.01)

(52) U.S. Cl.
 CPC ............. *G08G 1/168* (2013.01); *B60W 50/14* (2013.01)

(58) Field of Classification Search
 None
 See application file for complete search history.

(56) References Cited

U.S. PATENT DOCUMENTS

| | | | |
|---|---|---|---|
| 11,514,795 B1 * | 11/2022 | Hawley | B62D 15/0285 |
| 2019/0359058 A1 | 11/2019 | Sato | |
| 2022/0111864 A1 * | 4/2022 | Jarquin Arroyo | G06V 10/82 |
| 2022/0198928 A1 * | 6/2022 | Liu | G06T 7/73 |
| 2022/0274589 A1 * | 9/2022 | Gao | B62D 15/0285 |

FOREIGN PATENT DOCUMENTS

| | | |
|---|---|---|
| JP | 5637493 B2 | 12/2014 |
| JP | 5716700 B2 | 5/2015 |
| NO | 2016198522 A1 | 12/2016 |

OTHER PUBLICATIONS

Lees, et al., "The Influence of Distraction and Driving Context on Driver Response to Imperfect Collision Warning Systems," Ergonomics, vol. 50, No. 8, pp. 1264-1286, Aug. 2007. To link to this article: DOI: 10.1080/00140130701318749 URL: http://dx.doi.0rg/10.1080/00140130701318749.

* cited by examiner

*Primary Examiner* — Munear T Akki
(74) *Attorney, Agent, or Firm* — Peter H. Yu; HERE GLOBAL B.V.

(57) ABSTRACT

An apparatus, method and computer program product are provided for providing adaptive vehicle parking assistance. In one example, the apparatus receives sensor data indicating a user's interaction associated with a vehicle parking assistance feature. The vehicle parking assistance feature is a feature in which a vehicle causes a notification on a user interface in response to an object abutting or overlapping a virtual zone surrounding the vehicle. The apparatus determines a level of the user's familiarity on using the vehicle parking assistance feature based on the sensor data, and the apparatus adjusts a size of the virtual zone based on the level.

20 Claims, 14 Drawing Sheets

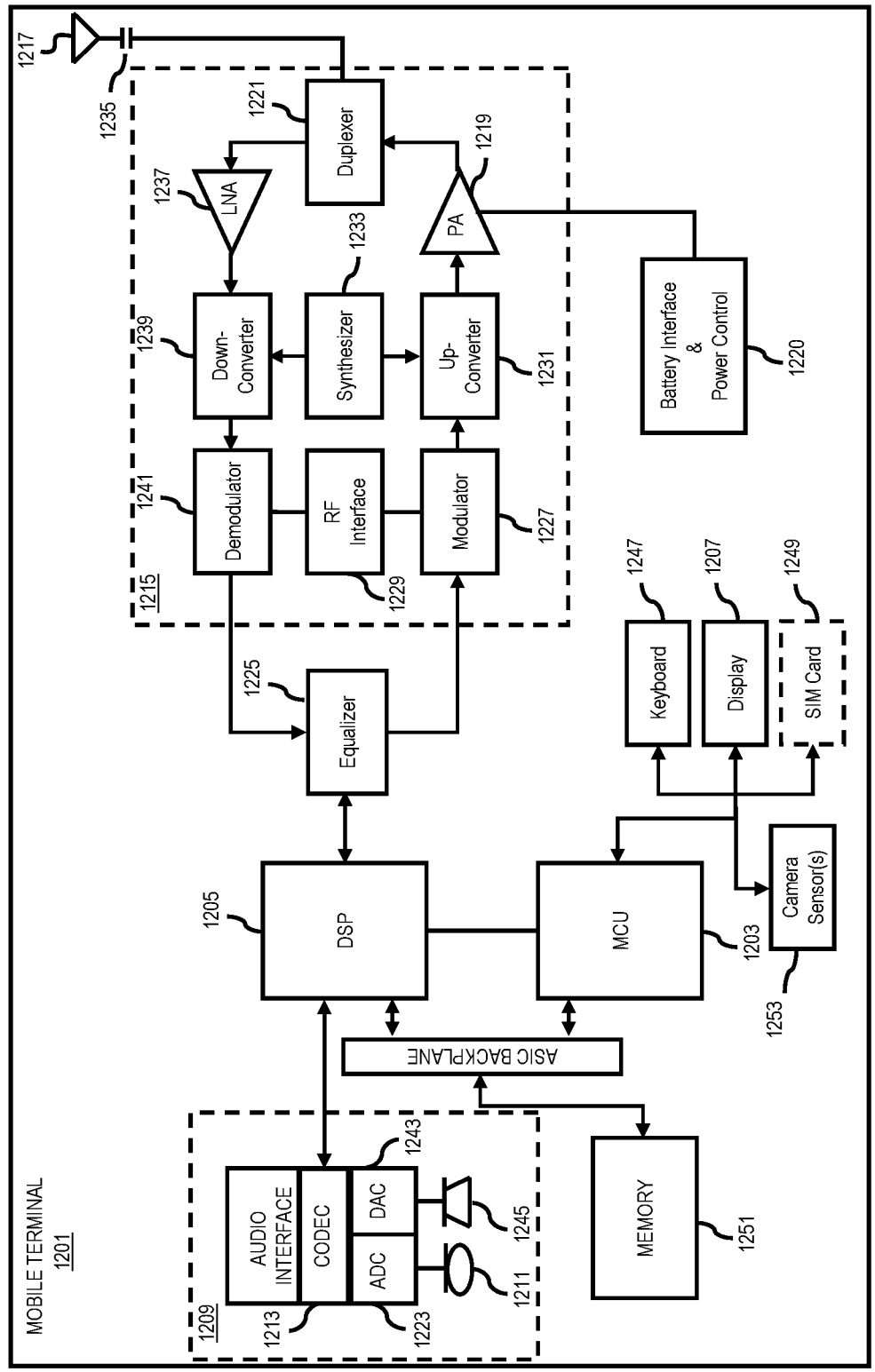

APPARATUS AND METHODS FOR PROVIDING ADAPTIVE VEHICLE PARKING ASSISTANCE BASED ON A DRIVER'S FAMILIARITY WITH A VEHICLE

TECHNICAL FIELD

The present disclosure generally relates to the field of vehicle parking assistance, associated methods and apparatus, and in particular, concerns, for example, an apparatus configured to provide an adaptive and dynamic vehicle parking assistance based on a user's level of familiarity associated with a vehicle's dimensions and capabilities.

BACKGROUND

Vehicles may be equipped with sensors such as cameras and lidar to assist drivers attempting to park by detecting proximity of nearby objects relative to the vehicles. Such sensors may operate with various vehicle systems (e.g., an infotainment system) to visually and/or audibly inform the drivers when the vehicles are too close to such objects. While the vehicle parking assistance feature may be helpful to some drivers, such feature may be redundant and/or distracting for experienced drivers that are familiar with the vehicles' dimensions and capabilities. Additionally, novice drivers may be dependent on such feature and require additional assistance when the drivers are attempting to perform vehicle parking maneuvers. Since a threshold distance at which the vehicle parking assistance feature renders a notification of proximity between a vehicle and an object is static, the convenience and utility of such feature are limited.

The listing or discussion of a prior-published document or any background in this specification should not necessarily be taken as an acknowledgement that the document or background is part of the state of the art or is common general knowledge.

BRIEF SUMMARY

According to a first aspect, a non-transitory computer-readable storage medium having computer program code instructions stored therein is described. The computer program code instructions, when executed by at least one processor, cause the at least one processor to: receive sensor data indicating a user's interaction associated with a vehicle parking assistance feature, wherein the vehicle parking assistance feature is a feature in which a vehicle causes a notification on a user interface in response to an object abutting or overlapping a virtual zone surrounding the vehicle; based on the sensor data, determine a level of the user's familiarity on using the vehicle parking assistance; and based on the level, adjust a size of the virtual zone.

According to a second aspect, an apparatus comprising at least one processor and at least one non-transitory memory including computer program code instructions is described. The computer program code instructions, when executed, cause the apparatus to: receive historical data indicating events in which drivers performed vehicle parking maneuvers; using the historical data, train a machine learning model to determine a virtual zone for a vehicle parking assistance feature as a function of vehicle attribute data associated with a vehicle and driver attribute data associated with a target driver of the vehicle, wherein the virtual zone surrounds the vehicle, and wherein the vehicle parking assistance feature is a feature in which the vehicle causes a notification on a user interface in response to an object abutting or overlapping the virtual zone.

According to a third aspect, a method of providing adaptive vehicle parking assistance is described. The method comprising: receiving vehicle attribute data associated with a vehicle and driver attribute data associated with a target driver of the vehicle; and causing a machine learning model to determine a virtual zone based on the vehicle attribute data and the driver attribute data, wherein the virtual zone surrounds the vehicle, and wherein the machine learning model is trained to generate the virtual zone based on historical data indicating events in which drivers performed vehicle parking maneuvers; and while the vehicle is being parked: determining proximity of the vehicle relative to an object; and responsive to the object abutting or overlapping the virtual zone, causing a notification on a user interface.

Also, a computer program product may be provided. For example, a computer program product comprising instructions which, when the program is executed by a computer, cause the computer to carry out the steps described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings:

FIG. 12 illustrates a diagram of exemplary components of a mobile terminal for communications, which is capable of operating in the system of FIG. 1.

DETAILED DESCRIPTION

Certain vehicles include a vehicle parking assistance feature for assisting drivers when the drivers are attempting to execute parking maneuvers. The vehicle parking assistance feature is a feature in which a vehicle causes a notification to a driver when proximity sensors (e.g., lidar, camera, etc.) of the vehicle detect that the vehicle is too close to a neighboring physical object while a vehicle parking maneuver is being executed. For example, if the vehicle is positioned at 50 cm away from another vehicle while a driver of the vehicle is executing a parking maneuver, the vehicle may cause a notification via speakers and/or a user interface that the vehicle is too close to the other vehicle. While the vehicle parking assistance feature may be helpful to some drivers, such feature may be redundant and/or distracting for experienced drivers that are familiar with the vehicles' dimensions and capabilities. Additionally, novice drivers may be dependent on such feature and require additional assistance when the drivers are attempting to perform vehicle parking maneuvers. Since a threshold distance at which the vehicle parking assistance feature provides a notification of proximity between a vehicle and an object is static, the utility of such feature is limited to a smaller scope of drivers. Therefore, there is a need in the art that remedies the aforementioned issues.

Figure 1:
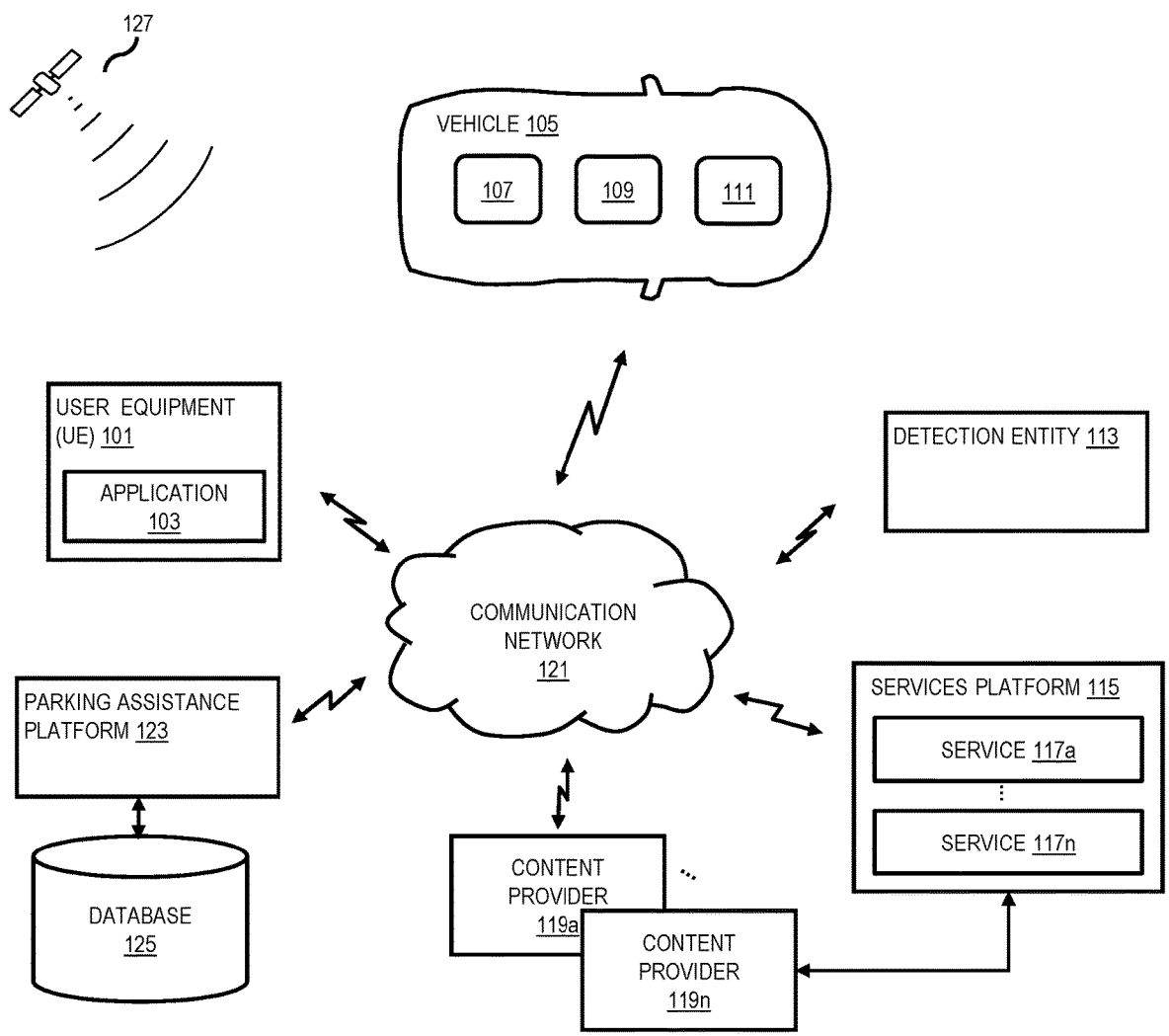
FIG. 1 illustrates a diagram of a system capable of providing adaptive vehicle parking assistance.

FIG. 1 is a diagram of a system 100 capable of providing adaptive vehicle parking assistance, according to one embodiment. The system includes a user equipment (UE) 101, a vehicle 105, a detection entity 113, a services platform 115, content providers 119a-119n, a communication network 121, an parking assistance platform 123, a database 125, and a satellite 127. Additional or a plurality of mentioned components may be provided.

In the illustrated embodiment, the system 100 comprises a user equipment (UE) 101 that may include or be associated with an application 103. In one embodiment, the UE 101 has connectivity to the parking assistance platform 123 via the communication network 121. The parking assistance platform 123 performs one or more functions associated with providing adaptive vehicle parking assistance. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with a vehicle (e.g., as part of an infotainment system of the vehicle), or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.).

In the illustrated embodiment, the application 103 may be any type of application that is executable by the UE 101, such as a parking assistance a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the parking assistance platform 123 and perform one or more functions associated with the functions of the parking assistance platform 123 by interacting with the parking assistance platform 123 over the communication network 121. The application 103 may assist in conveying and/or receiving information regarding a vehicle parking assistance feature. For example, the application 103 may cause the UE 101 to provide a notification indicating proximity of the vehicle 105 relative to an object while the vehicle 105 is being parked.

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. The vehicle 105 may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle 105 may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle 105, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, the UE 101 may be integrated in the vehicle 105, which may include assisted driving vehicles such as autonomous vehicles, highly assisted driving (HAD), and advanced driving assistance systems (ADAS). Any of these assisted driving systems may be incorporated into the UE 101. Alternatively, an assisted driving device may be included in the vehicle 105. The assisted driving device may include memory, a processor, and systems to communicate with the UE 101. In one embodiment, the vehicle 105 may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle 105 may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

The vehicle 105 includes sensors 107, an on-board communication platform 109, and an on-board computing platform 111. The sensors 107 may include image sensors (e.g., electronic imaging devices of both analog and digital types, which include digital cameras, camera modules, camera phones, thermal imaging devices, radar, sonar, lidar, etc.), a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, suspension sensor, tilt sensors to detect the degree of incline or decline of the vehicle 105 along a path of travel, etc. In a further embodiment, one or more of the sensors 107 about the perimeter of the vehicle 105 may detect the relative distance of the vehicle 105 from stationary objects (e.g., construct, wall, etc.), road objects, lanes, or roadways, the presence of other vehicles, pedestrians, traffic lights, road features (e.g., curves) and any other objects, or a combination thereof. Such sensors will be referred as proximity sensors, herein. In one embodiment, the vehicle 105 may include GPS receivers to obtain geographic coordinates from satellites 127 for determining current location and time associated with the vehicle 105. Further, the location can be determined by a triangulation system such as A-GPS, Cell of Origin, or other location extrapolation technologies.

The on-board communications platform 109 includes wired or wireless network interfaces to enable communication with external networks. The on-board communications platform 109 also includes hardware (e.g., processors, memory, storage, antenna, etc.) and software to control the wired or wireless network interfaces. In the illustrated example, the on-board communications platform 109 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 101.

The on-board computing platform 111 performs one or more functions associated with the vehicle 105. In one embodiment, the on-board computing platform 109 may aggregate sensor data generated by at least one of the sensors 107 and transmit the sensor data via the on-board communications platform 109. The on-board computing platform 109 may receive control signals for performing one or more of the functions from the parking assistance platform 123, the UE 101, the services platform 115, one or more of the content providers 119a-121n, or a combination thereof via the on-board communication platform 111. The on-board computing platform 111 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The detection entity 113 may be another vehicle, a drone, a user equipment, a road-side sensor, or a device mounted on a stationary object within or proximate to a road segment (e.g., a traffic light post, a sign post, a post, a building, etc.). The detection entity 113 includes one or more image sensors such as electronic imaging devices of both analog and digital types, which include digital cameras, camera modules, camera phones, thermal imaging devices, radar, sonar, lidar, etc. The detection entity 113 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the detection entity 113 along a path of travel, etc. In a further embodiment, sensors about the perimeter of the detection entity 113 may detect the relative distance of the detection entity 113 from road objects, lanes, or roadways, the presence of other vehicles, pedestrians, traffic lights, road features (e.g., curves) and any other objects, or a combination thereof. In one embodiment, the detection entity 113 may include GPS receivers to obtain geographic coordinates from satellites 127 for determining current location and time associated with the detection entity 113. Further, the location can be determined by a triangulation system such as A-GPS, Cell of Origin, or other location extrapolation technologies. The detection entity 113 may further include a receiver and a transmitter for maintaining communication with the parking assistance platform 123 and/or other components within the system 100.

The services platform 115 may provide one or more services 117a-117n (collectively referred to as services 117), such as mapping services, navigation services, travel planning services, weather-based services, emergency-based services, notification services, social networking services, content (e.g., audio, video, images, etc.) provisioning services, application services, storage services, contextual information determination services, location-based services, information-based services, etc. In one embodiment, the services platform 115 may be an original equipment manufacturer (OEM) platform. In one embodiment the one or more service 117 may be sensor data collection services. By way of example, vehicle sensor data provided by the sensors 107 may be transferred to the UE 101, the parking assistance platform 123, the database 125, or other entities communicatively coupled to the communication network 121 through the service platform 115. In one embodiment, the services platform 115 uses the output data generated by of the parking assistance platform 123 to provide services such as navigation, mapping, other location-based services, etc.

In one embodiment, the content providers 119a-119n (collectively referred to as content providers 119) may provide content or data (e.g., including geographic data, parametric representations of mapped features, etc.) to the UE 101, the vehicle 105, services platform 115, the vehicle 105, the database 125, the parking assistance platform 123, or the combination thereof. In one embodiment, the content provided may be any type of content, such as map content, textual content, audio content, video content, image content, etc. In one embodiment, the content providers 119 may provide content that may aid in providing adaptive vehicle parking assistance, and/or other related characteristics. In one embodiment, the content providers 119 may also store content associated with the UE 101, the vehicle 105, services platform 115, the parking assistance platform 123, the database 125, or the combination thereof. In another embodiment, the content providers 119 may manage access to a central repository of data, and offer a consistent, standard interface to data, such as a repository of the database 125.

The communication network 121 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the parking assistance platform 123 may be a platform with multiple interconnected components. The parking assistance platform 123 may include multiple servers, intelligent networking devices, computing devices, components and corresponding software for providing adaptive vehicle parking assistance. It should be appreciated that that the parking assistance platform 123 may be a separate entity of the system 100, included within the UE 101 (e.g., as part of the applications 103), included within the vehicle 105 (e.g., as part of an application stored in the memory of the on-board computing platform 111), included within the services platform 115 (e.g., as part of an application stored in server memory for the services platform 115), included within the content providers 119 (e.g., as part of an application stored in sever memory for the content providers 119), other platforms embodying a power supplier (not illustrated), or a combination thereof.

The parking assistance platform 123 provides a vehicle parking assistance feature that is tailored based on a driver's familiarity on dimensions and capabilities of the vehicle 105. The vehicle parking assistance feature is a feature in which the vehicle 105 causes a notification to a driver in response to the vehicle 105 being positioned at a threshold distance from a physical object while the driver is executing a parking maneuver. For example, while a driver of the vehicle 105 is executing a parking maneuver, proximity sensors of the vehicle 105 determine whether the vehicle is positioned at 50 cm or less from a physical object that can potentially collide with the vehicle 105 (e.g., another vehicle, wall, curb, etc.). Once the proximity sensors detect such condition, the vehicle 105 causes a notification to the driver indicating that the vehicle 105 is proximate to the physical object. The threshold distance, as used in the vehicle parking assistance feature, defines a virtual zone for the vehicle 105 that surrounds the vehicle 105. The shape and size of the virtual zone are defined at least in part by a number of proximity sensors equipped by the vehicle 105, the orientation and position of each of said proximity sensors relative to the vehicle 105, and the capabilities of the proximity sensors. In one embodiment, the parking assistance platform 123 determines the size of the virtual zone based further on the driver's familiarity on dimensions and capabilities of the vehicle 105.

To gauge a driver's familiarity on dimensions and capabilities of the vehicle 105, the parking assistance platform 123 may establish a driver profile that is uniquely assigned to the driver. The parking assistance platform 123 may identify the driver profile based on a user input provided via a user interface available within the vehicle 105 and/or the UE 101 (e.g., account name and password, user selection of a profile, etc.). In one embodiment, the parking assistance platform 123 may seamlessly associate a driver to a driver profile without receiving a user input designated for associating the driver to the driver profile. For example, the parking assistance platform 123 may acquire biometric data associated with the driver via one or more of the sensors 107 available within the vehicle 105 to establish the driver profile or retrieve the driver profile from the database 125 (e.g., using facial recognition to identify the driver, using weight of the driver to identify the driver, etc.). By way of another example, the parking assistance platform 123 may acquire other data that are unique for a specific driver, such as the driver's driving patterns, seat adjustment settings, rear view/side view mirror adjustment settings, etc., and use said data to associate the driver to the corresponding driver profile.

Once a driver profile is established or retrieved from the database, the parking assistance platform 123 determines the driver's familiarity on the vehicle's dimensions and capabilities. In one embodiment, the parking assistance platform 123 focuses on evaluating the driver's familiarity of the vehicle 105 based on a way of which the driver executes one or more parking maneuvers. The parking assistance platform 123 may identify the initiation of the parking maneuver when: (1) the vehicle 105 is positioned within a location that is designated as a parking location (e.g., a parking garage, a parking space, a parking lot, etc.), as indicated by map data; (2) a gear shift of the vehicle 105 is set to reverse; (3) the vehicle 105 reaches a destination of a route; or (4) a combination thereof. The parking assistance platform 123 may assess the driver's performance for executing a parking maneuver based on various factors, such as: (1) a speed at which the driver of the vehicle 105 executes the parking maneuver; (2) a period in which the driver executes the parking maneuver; (3) one or more timings in which the vehicle 105 accelerates while the driver executes the parking maneuver; (4) one or more timings in which the vehicle 105 slows down while the driver executes the parking maneuver; (5) facial expressions of the driver during the parking maneuver; (6) a number and duration of the driver's head movements during and after the parking maneuver; (7) a duration or frequency at which the driver uses the vehicle parking assistance feature; (8) a number of attempts performed by the driver to successfully park the vehicle 105; (9) a number of gear shift changes; or (10) a combination thereof. For example, the parking assistance platform 123 may rate a level of the driver's familiarity on the vehicle's dimensions and capabilities at a "high" level if the driver smoothly parks the vehicle 105 into a desired parking space without abruptly braking and executing a threshold number of gear shift changes. By way of another example, the parking assistance platform 123 may rate the level of the driver's familiarity at a "high" level if the driver does not render a confused facial expression and turn his/her head less than a predetermined number of times to evaluate spacings between the vehicle 105 and objects neighboring the desired parking space. In one embodiment, the parking assistance platform 123 identifies one or more ideal parking maneuvers for a given parking space based on attributes of the parking space. For example, if the parking assistance platform 123 determines that the vehicle 105 is attempting to park at a parking space that requires a perpendicular parking maneuver, the parking assistance platform 123 determines that the ideal parking maneuver for the parking space is maneuvering the vehicle 105 to move forward and turn into the parking space or maneuvering the vehicle 105 to reverse and turn into the parking space. By way of another example, if the parking assistance platform 123 determines that the vehicle 105 is attempting to park at a parking space that requires a parallel parking maneuver, the parking assistance platform 123 determines that the ideal parking maneuvers for the parking space is: (1) maneuvering the vehicle 105 to move next to an object (e.g., another vehicle) positioned in front of the parking space; (2) maneuvering the vehicle 105 to reverse; (3) maneuvering the vehicle 105 to turn into the parking space; and (4) maneuvering the vehicle 105 to move slightly forward once the vehicle 105 is positioned into the parking space. As a parking maneuver executed by a driver deviates from an ideal parking maneuver, the parking assistance platform 123 lowers a rating of the driver's familiarity on dimensions and capabilities of the vehicle 105; whereas as the parking maneuver executed by the driver becomes similar to the ideal parking maneuver, the parking assistance platform 123 increases the rating of the driver's familiarity of the vehicle 105. In one embodiment, the parking assistance platform 123 determines the driver's familiarity on dimensions and capabilities of the vehicle 105 based on other factors, such as: (1) an overall period in which the driver has used the vehicle 105; (2) a degree at which the driver follows one or more traffic rules designated for a given road link; (3) a level smoothness in which the driver transitions the vehicle 105 from a stationary state to a moving state, vice versa; (4) a level smoothness in which the driver transitions the vehicle 105 from one lane to another; (5) a number of instances in which the vehicle 105 has collided with an object; (6) an average amount of distance rendered between the vehicle 105 and the preceding vehicle when the driver maneuvers the vehicle 105; or (7) a combination thereof.

Once the parking assistance platform 123 determines the driver's familiarity on a vehicle's dimensions and capabilities, the parking assistance platform 123 determines a size of the virtual zone based on the familiarity. For example, if the level of the driver's familiarity on the vehicle's dimensions and capabilities is at a "high" level, the parking assistance platform 123 may decrease the size of the virtual zone; whereas if the level of the driver's familiarity on the vehicle's dimensions and capabilities is at a "low" level, the parking assistance platform 123 may decrease the size of the virtual zone. As such, experienced drivers are less likely to be impacted by notifications and alarms associated with the vehicle parking assistance feature; whereas novice drivers are more likely to be exposed to said notifications and alarms. In one embodiment, the parking assistance platform 123 tracks a level of familiarity on a vehicle's dimensions and capabilities for each user of the vehicle 105. As time passes and a user of the vehicle does not use the vehicle 105, the level of familiarity on the vehicle's dimensions and capabilities for the user decays. As the level of the user's familiarity on the vehicle's dimensions and capabilities decreases, the virtual zone assigned for the user returns to a default virtual zone size. For example, if a user's familiarity on the vehicle's dimensions and capabilities is at a "high" level, the virtual zone assigned for the user gradually increases back to the default size as the amount of time that the user does not use the vehicle 105 increases; whereas if the user's familiarity on the vehicle's dimensions and capabilities is at a "low" level, the virtual zone assigned for the user remains the same or gradually increases as the amount of time that the user does not use the vehicle 105 increases.

In one embodiment, the parking assistance platform 123 alters the virtual zone based on an environment within a cabin of the vehicle 105. For example, the parking assistance platform 123 may communicate with image sensors and/or audio recorders available within the vehicle cabin to monitor a level of activity occurring within the vehicle 105. If the parking assistance platform 123 receive sensor data indicating that the activity within the cabin of the vehicle 105 is noisy and/or disruptive for the driver, the parking assistance platform 123 may increase the size of the virtual zone. For example, if the parking assistance platform 123 determines that the driver is using his/her phone and/or passengers within the vehicle 105 are generating disruptive noises, the parking assistance platform 123 increases the size of the virtual zone. In one embodiment, the parking assistance platform 123 communicates with image sensors available within the vehicle cabin to monitor a state of a driver operating the vehicle 105. In such embodiment, the parking assistance platform 123 analyses sensor data acquired by the image sensors to determine: (1) a degree, frequency, and duration at which eyes of the driver close; (2) a degree, frequency, and duration at which an eye angle of the driver deviates from one or more normal eye angles for maneuvering the vehicle 105; and (3) a degree, frequency, and duration at which a head position of the driver deviates from one or more normal head positions for maneuvering the vehicle 105. Based on the analysis, the parking assistance platform 123 determines whether the driver of the vehicle 105 is distracted (e.g., the driver is watching his/her phone) and/or drowsy. If the parking assistance platform 123 determines that the driver is distracted and/or drowsy, the parking assistance platform 123 may increase the size of the virtual zone, thereby decreasing the chance of which the driver will cause the vehicle 105 to collide with another object while executing a parking maneuver.

In one embodiment, the parking assistance platform 123 alters the virtual zone based on an environment in which the vehicle 105 is located. For example, the parking assistance platform 123 may acquire data indicating weather conditions associated with a location in which a driver of the vehicle 105 wishes to execute a parking maneuver. If the parking assistance platform 123 determines that the weather conditions will impact visibility for the driver and operations of proximity sensors of the vehicle 105 (e.g., heavy rain, snow), the parking assistance platform 123 may decrease the size of the virtual zone. By way of another example, the parking assistance platform 123 may acquire data indicating a traffic density associated with a location in which a driver of the vehicle 105 wishes to execute a parking maneuver. In such example, the parking assistance platform 123 increases the size of the virtual zone for the location as a level of traffic density associated with the location increases and decreases increases the size of the virtual zone as the level of traffic density associated with the location decreases. In one embodiment, the parking assistance platform 123 may acquire data indicating a number of vehicle accidents that has occurred within the location and adjust the size of the virtual zone based on the data. In such embodiment, the parking assistance platform 123 increases the size of the virtual zone as the number of vehicle accidents that has occurred within the location increases. In one embodiment, the parking assistance platform 123 dynamically adjusts the size of the virtual zone based on temporal data indicating time and date. Specifically, the parking assistance platform 123 uses the temporal data to derive a sun angle with respect to a location of the vehicle 105. As the sun angle transitions to indicate daytime at the location of the vehicle 105, the size of the virtual zone decreases, and as the sun angle transitions to indicate night-time at the location of the vehicle 105, the size of the virtual zone increases.

In one embodiment, the parking assistance platform 123 employs a machine learning model to output a suitable virtual zone for a driver using a parking assistance feature. The machine learning model may be trained based on historical data indicating events in which drivers executed parking maneuvers to park vehicles. The historical data may indicate: (1) vehicle attribute data indicating attributes of the vehicles; (2) environmental conditions associated with locations in which the drivers executed the parking maneuvers; (3) driver attribute data associated with the drivers; or (4) a combination thereof. In such example, the vehicle attribute data may indicate attributes of said vehicles, types of proximity sensors equipped by the said vehicles, orientations of the proximity sensors, etc. The environmental condition data may indicate weather conditions associated with the locations of the events, parking density information associated with said location, types of parking space that define the location, dimensions of the parking space, etc. The driver attribute data may indicate driving experience information associated with the drivers. The driving experience information may indicate: (1) overall durations in which the drivers used the vehicles; (2) a number of instances in which the drivers have used the vehicles to perform the parking maneuvers; (3) a number of instances in which the drivers used the vehicles to park in parking spaces; (4) an average number of attempts executed by one of the drivers to park one of the vehicles in one of the parking spaces; or (5) a combination thereof. In one embodiment, the machine learning model uses the historical data to learn minimum clearances needed to successfully park the vehicles into the parking spaces. In such embodiment, the machine learning model uses the minimum clearance to define a virtual zone for a given driver. The minimum clearance defines a minimum distance between a vehicle and an object throughout a period in which a driver of the vehicle executes a parking maneuver. Once the machine learning model is trained, the parking assistance platform 123 may receive a request to render a virtual zone for a driver of the vehicle 105. To render the virtual zone, the parking assistance platform 123 acquires: (1) vehicle attribute data associated with the vehicle 105; (2) environmental condition data indicating environmental conditions associated with a location in which the driver wishes to park the vehicle 105; (3) driver attribute data associated with the driver; or (4) a combination thereof. The parking assistance platform 123 compares acquired data to historical data to identify corresponding elements. For example, the parking assistance platform 123 may acquire data indicating that the driver has used the vehicle 105 for 3 months. The machine learning model compares such data to the historical data and identify events in which drivers have used vehicles similar to the vehicle 105 for 3 months. Once the events are identified, the machine learning model determines a minimum clearance needed for each of the vehicles, as identified in the events, to successfully park and uses an average of all the minimum clearances needed for the vehicles to successfully park to determine the virtual zone. It is contemplated that the application of the machine learning model is particularly useful in scenarios in which the parking assistance platform 123 identifies a new driver of the vehicle 105.

In one embodiment, the parking assistance platform 123 may determine a shape of the virtual zone for a driver using the parking assistance feature. The shape of the virtual zone is limited based on: (1) a number of proximity sensors available within the vehicle 105; (2) a relative position of each proximity sensor with respect to the vehicle 105; and (3) an orientation of each proximity sensor. In one embodiment, the shape of the virtual zone corresponds to an outline of the vehicle 105 at a plan view, and the center of the virtual zone aligns with the center of the vehicle 105. In one embodiment, the shape of the virtual zone may vary based on attributes of a vehicle. For example, for a vehicle having a driver seat on the left side of the vehicle, the width of the virtual zone at the right side of the vehicle may be greater than the width of the virtual zone at the left side of the vehicle; whereas for a vehicle having a driver seat on the right side of the vehicle, the width of the virtual zone at the left side of the vehicle may be greater than the width of the virtual zone at the right side of the vehicle. As such, when a driver utilizes a vehicle parking assistance feature, the parking assistance platform 123 provides greater awareness for the driver on a side of the vehicle that is harder for the driver to observe.

In the illustrated embodiment, the database 125 stores information on road links (e.g., road length, road breadth, slope information, curvature information, geographic attributes, etc.), probe data for one or more road links (e.g., traffic density information), POIs, and other types map-related features. In one embodiment, the database 125 may include any multiple types of information that can provide means for aiding in providing adaptive vehicle parking assistance. It should be appreciated that the information stored in the database 125 may be acquired from any of the elements within the system 100, other vehicles, sensors, database, or a combination thereof.

In one embodiment, the UE 101, the vehicle 105, the detection entity 113, the services platform 115, the content providers 119, the parking assistance platform 123 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
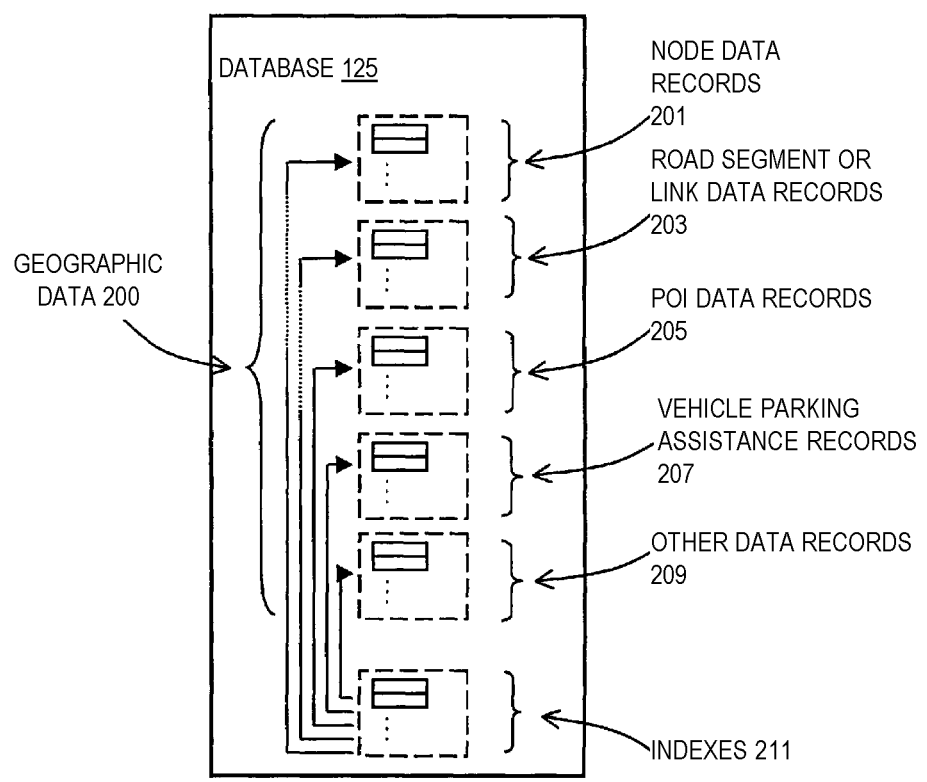
FIG. 2 illustrates a diagram of the database within the system of FIG. 1.

FIG. 2 is a diagram of a database 125 (e.g., a map database), according to one embodiment. In one embodiment, the database 125 includes data 200 used for (or configured to be compiled to be used for) mapping and/or navigation-related services, such as for personalized route determination, according to exemplary embodiments.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the database 125.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the database 125 follows certain conventions. For example, links do not cross themselves and do not cross each other except at a node or vertex. Also, there are no duplicated shape points, nodes, or links. Two links that connect each other have a common node or vertex. In the database 125, overlapping geographic features are represented by overlapping polygons. When polygons overlap, the boundary of one polygon crosses the boundary of the other polygon. In the database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the database 125 is presented according to a hierarchical or multi-level tile projection. More specifically, in one embodiment, the database 125 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

As shown, the database 125 includes node data records 201, road segment or link data records 203, POI data records 205, vehicle parking assistance records 207, other records 209, and indexes 211, for example. More, fewer or different data records can be provided. In one embodiment, additional data records (not shown) can include cartographic ("carto") data records, routing data, and maneuver data. In one embodiment, the indexes 211 may improve the speed of data retrieval operations in the database 125. In one embodiment, the indexes 211 may be used to quickly locate data without having to search every row in the database 125 every time it is accessed.

In exemplary embodiments, the road segment data records 203 are links or segments representing roads, streets, or paths, as can be used in the calculated route or recorded route information for determination of one or more personalized routes. The node data records 201 are end points (such as intersections) corresponding to the respective links or segments of the road segment data records 203. The road link data records 203 and the node data records 201 represent a road network, such as used by vehicles, cars, and/or other entities. Alternatively, the database 125 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

Links, segments, and nodes can be associated with attributes, such as geographic coordinates, a number of road objects (e.g., road markings, road signs, traffic light posts, etc.), types of road objects, traffic directions for one or more portions of the links, segments, and nodes, traffic history associated with the links, segments, and nodes, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, factories, buildings, stores, parks, etc. The database 125 can include data about the POIs and their respective locations in the POI data records 205. The database 125 can also include data about places, such as cities, towns, or other communities, and other geographic features, such as bodies of water, mountain ranges, etc. Such place or feature data can be part of the POI data records 205 or can be associated with POIs or POI data records 205 (such as a data point used for displaying or representing a position of a city).

The vehicle parking assistance records 207 include information on a plurality of vehicles, where information associated with each of the plurality of vehicles include one or more driver profile information. The driver profile information indicates: (1) an identity of a driver; (2) variables used for deriving the driver's familiarity on capabilities and dimensions of the vehicle associated with the driver; (3) a level of the driver's familiarity on capabilities and dimensions of the vehicle; (4) a virtual zone assigned for the driver; (5) the driver's preference for using the vehicle parking assistance feature (e.g., desired virtual zone, desired level of notification alerts, etc.); and (6) an amount of time until the level of the driver's familiarity on capabilities and dimensions of the vehicle decays. The vehicle parking assistance records 207 may also include information on types and degrees of variables and/or factors that define a driver of a vehicle as being an experienced or inexperienced driver. The vehicle parking assistance records 207 also include historical data indicating events in which drivers executed parking maneuvers to park vehicles. The historical data may indicate: (1) vehicle attribute data indicating attributes of the vehicles; (2) environmental conditions associated with locations in which the drivers executed the parking maneuvers; (3) driver attribute data associated with the drivers; or (4) a combination thereof. The vehicle attribute data may indicate attributes of said vehicles, types of proximity sensors equipped by the said vehicles, orientations of the proximity sensors, etc. The environmental condition data may indicate weather conditions associated with the locations of the events, parking density information associated with said location, types of parking space that define the location, dimensions of the parking space, etc. The driver attribute data may indicate driving experience information associated with the drivers. The driving experience information may indicate: (1) overall durations in which the drivers used the vehicles; (2) a number of instances in which the drivers have used the vehicles to perform the parking maneuvers; (3) a number of instances in which the drivers used the vehicles to park in parking spaces; (4) an average number of attempts executed by one of the drivers to park one of the vehicles in one of the parking spaces; or (5) a combination thereof.

Other records 209 may include data indicating specifications of vehicles, such as dimensions of the vehicles, types of vehicles, types of proximity sensors equipped by the vehicles, orientations of the proximity sensors, etc.

In one embodiment, the database 125 can be maintained by the services platform 115 and/or one or more of the content providers 119 in association with a map developer. The map developer can collect geographic data to generate and enhance the database 125. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 125 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing adaptive vehicle parking assistance may be advantageously implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

Figure 3:
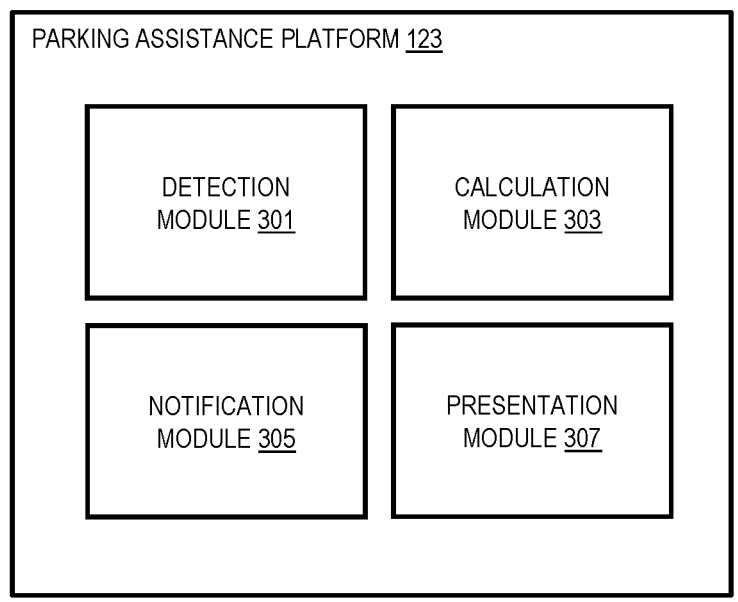
FIG. 3 illustrates a diagram of the components of the parking assistance platform of FIG. 1.

FIG. 3 is a diagram of the components of the parking assistance platform 123, according to one embodiment. By way of example, the parking assistance platform 123 includes one or more components for providing adaptive vehicle parking assistance. It is contemplated that the functions of these components may be combined in one or more components or performed by other components of equivalent functionality. In this embodiment, the parking assistance platform 123 includes a detection module 301, a calculation module 303, a notification module 305, and a presentation module 307.

The detection module 301 is capable of acquiring a driver profile that is uniquely assigned for a driver of the vehicle 105. In one embodiment, the detection module 301 may identify the driver profile based on a user input provided via a user interface available within the vehicle 105 and/or the UE 101 (e.g., account name and password, user selection of a profile, etc.). In one embodiment, the detection module 301 may seamlessly associate a driver to a driver profile without receiving a user input designated for associating the driver to the driver profile. For example, the detection module 301 may acquire biometric data associated with the driver via one or more of the sensors 107 available within the vehicle 105 to establish the driver profile or retrieve the driver profile from the database 125 (e.g., using facial recognition to identify the driver, using weight of the driver to identify the driver, etc.). By way of another example, the detection module 301 may acquire other data that are unique for a specific driver, such as the driver's driving patterns, seat adjustment settings, rear view/side view mirror adjustment settings, etc., and use said data to associate the driver to the corresponding driver profile.

In one embodiment, the detection module 301 may detect an initiation of a parking maneuver when: (1) the vehicle 105 is positioned within a location that is designated as a parking location (e.g., a parking garage, a parking space, a parking lot, etc.), as indicated by map data; (2) a gear shift of the vehicle 105 is set to reverse; (3) the vehicle 105 reaches a destination of a route; or (4) a combination thereof. In one embodiment, the detection module 301 may acquire data from the vehicle 105, where the data indicate: (1) a speed at which a driver of the vehicle 105 executes a parking maneuver; (2) a period in which the driver executes the parking maneuver; (3) one or more timings in which the vehicle 105 accelerates while the driver executes the parking maneuver; (4) one or more timings in which the vehicle 105 slows down while the driver executes the parking maneuver; (5) facial expressions of the driver during the parking maneuver; (6) a number and durations of the driver's head movements during and after the parking maneuver; (7) a duration or frequency at which the driver uses the vehicle parking assistance feature; (8) a number of attempts performed by the driver to successfully park the vehicle 105; (9) a number of gear shift changes; or (10) a combination thereof.

The calculation module 303 is capable of analyzing the data acquire by the detection module 301. In one embodiment, the calculation module 303 updates a level of the driver's familiarity on the vehicle's dimensions and capabilities based on sensor data acquired by the detection module 301. For example, the calculation module 303 may rate a level of the driver's familiarity on the vehicle's dimensions and capabilities at a "high" level if the driver smoothly parks the vehicle 105 into a desired parking space without abruptly braking and executing a threshold number of gear shift changes. By way of another example, the calculation module 303 may rate the level of the driver's familiarity at a "high" level if the driver does not render a confused facial expression and turn his/her head less than a predetermined number of times to evaluate spacings between the vehicle 105 and objects neighboring the desired parking space.

In one embodiment, the detection module 301 may acquire data indicating one or more attributes of a parking space from sensors equipped by the vehicle 105 and/or one or more detection entities 113 proximate to the parking space. In such embodiment, the calculation module 303 uses the data to identify one or more ideal parking maneuvers for a given parking space based on the attributes of the parking space. For example, if the detection module 301 detects that the vehicle 105 is attempting to park at a parking space that requires a perpendicular parking maneuver, the calculation module 303 determines that the ideal parking maneuver for the parking space is maneuvering the vehicle 105 to move forward and turn into the parking space or maneuvering the vehicle 105 to reverse and turn into the parking space. By way of another example, if the detection module 301 detects that the vehicle 105 is attempting to park at a parking space that requires a parallel parking maneuver, the calculation module 303 determines that the ideal parking maneuvers for the parking space is: (1) maneuvering the vehicle 105 to move next to an object (e.g., another vehicle) positioned in front of the parking space; (2) maneuvering the vehicle 105 to reverse; (3) maneuvering the vehicle 105 to turn into the parking space; and (4) maneuvering the vehicle 105 to move slightly forward once the vehicle 105 is positioned into the parking space. As a parking maneuver executed by a driver deviates from an ideal parking maneuver, the calculation module 303 lowers a rating of the driver's familiarity on dimensions and capabilities of the vehicle 105; whereas as the parking maneuver executed by the driver becomes similar to the ideal parking maneuver, the calculation module 303 increases the rating of the driver's familiarity of the vehicle 105.

Figure 4A:
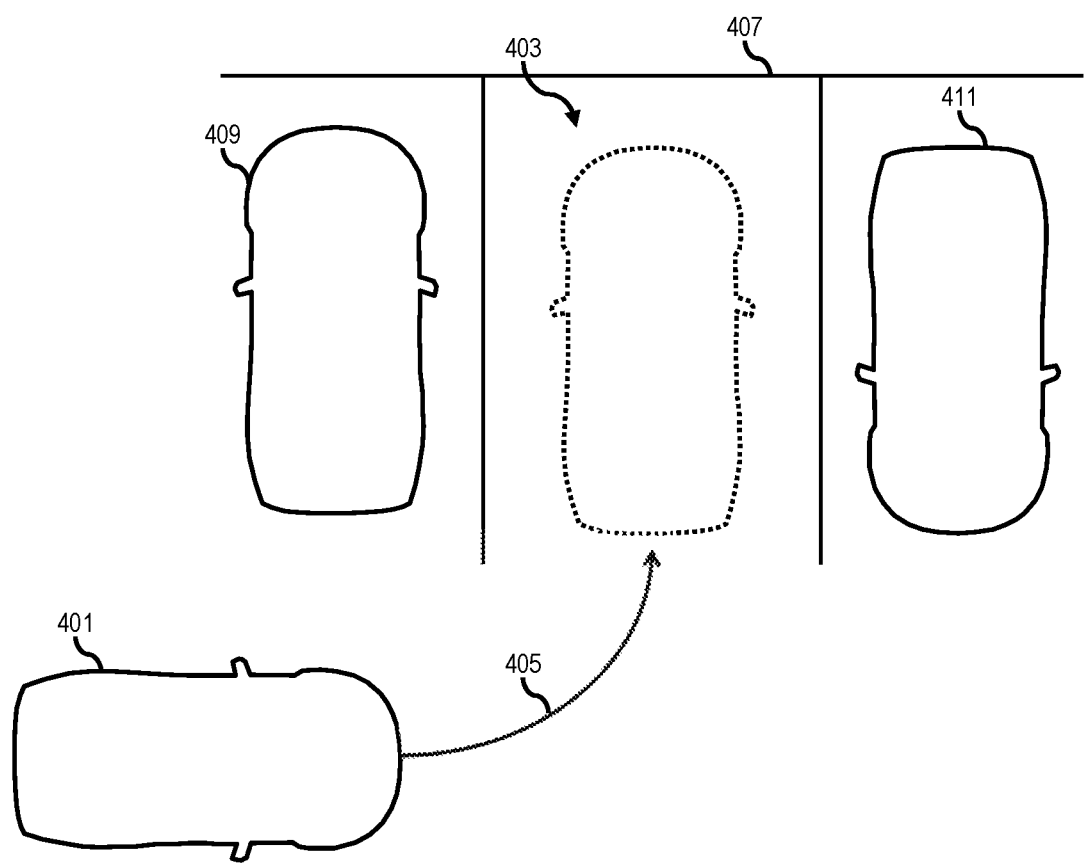
FIG. 4A illustrates an example ideal parking maneuver as determined by the calculation module of FIG. 3.
Figure 4B:
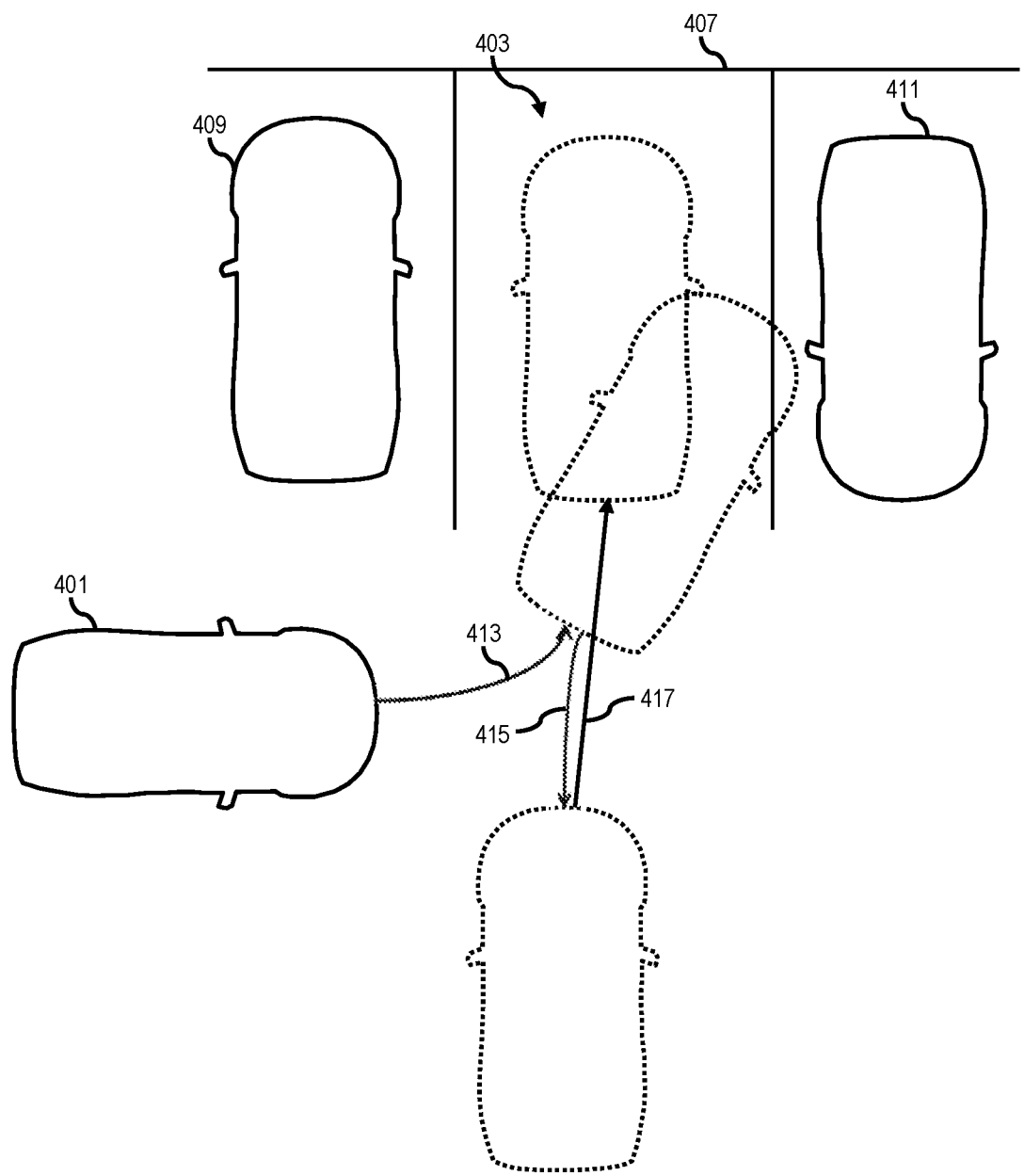
FIG. 4B illustrates example parking maneuvers that deviate from the ideal parking maneuver of FIG. 4A.

FIG. 4A illustrates an example ideal parking maneuver as determined by the calculation module 303. In the illustrated example, a vehicle 401 is attempting to park into a perpendicular parking space 403. The detection module 301 acquires sensor data from proximity sensors (not illustrated) equipped by the vehicle 401 and determines that the vehicle 401 is attempting to park into the perpendicular parking space 403. Based on the sensor data, the calculation module 303 renders an ideal parking maneuver 405 based on: (1) the current position/orientation of the vehicle 401; (2) the position/orientation of the perpendicular parking space 403; and (3) the positions/orientations of other objects such as lane markings 407 and parked vehicles 409 and 411. FIG. 4B illustrates example parking maneuvers that deviate from the ideal parking maneuver of FIG. 4A. In the illustrated example, the driver of the vehicle 401 has executed a first parking maneuver 413 in which the driver has steered the vehicle 401 at an angle with respect to the perpendicular parking space 403. Since the parking maneuver 410 has caused the vehicle 401 to be too close to one of the parked vehicles 409, the driver has executed a second parking maneuver 415 to reposition the vehicle 409 and a third parking maneuver 417 to move the vehicle 401 into the perpendicular parking space 403. Since the parking maneuvers executed by the driver is substantially different from the ideal parking maneuver 405, the calculation module 303 lowers a level of the driver's familiarity on dimensions and capabilities of the vehicle 401.

In one embodiment, the calculation module 303 determines the driver's familiarity on dimensions and capabilities of the vehicle 105 based on other factors, such as: (1) an overall period in which the driver has used the vehicle 105; (2) a degree at which the driver follows one or more traffic rules designated for a given road link; (3) a level smoothness in which the driver transitions the vehicle 105 from a stationary state to a moving state, vice versa; (4) a level smoothness in which the driver transitions the vehicle 105 from one lane to another; (5) a number of instances in which the vehicle 105 has collided with an object; (6) an average amount of distance rendered between the vehicle 105 and the preceding vehicle when the driver maneuvers the vehicle 105; or (7) a combination thereof.

Once the calculation module 303 determines the driver's familiarity on a vehicle's dimensions and capabilities, the calculation module 303 determines a size of the virtual zone based on the familiarity. For example, if the level of the driver's familiarity on the vehicle's dimensions and capabilities is at a "high" level, the calculation module 303 may decrease the size of the virtual zone; whereas if the level of the driver's familiarity on the vehicle's dimensions and capabilities is at a "low" level, calculation module 303 may decrease the size of the virtual zone. As such, experienced drivers are less likely to be exposed to notifications and alarms associated with the vehicle parking assistance feature; whereas novice drivers are more likely to be exposed to said notifications and alarms.

Figure 5A:
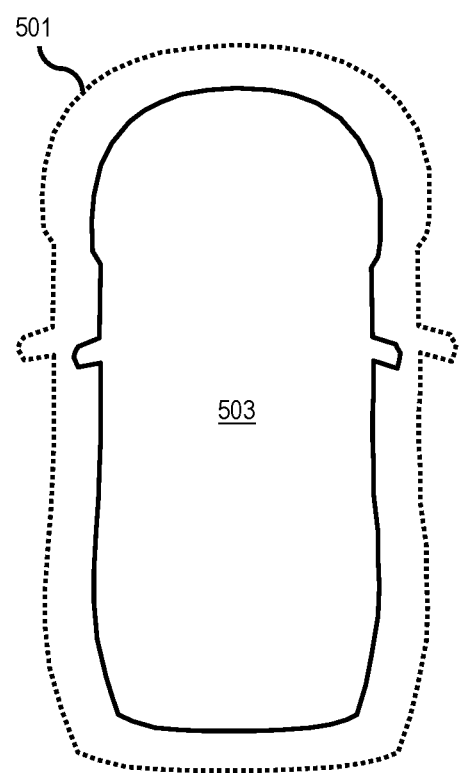
FIG. 5A illustrates a first example virtual zone for an experienced driver of a vehicle.
Figure 5B:
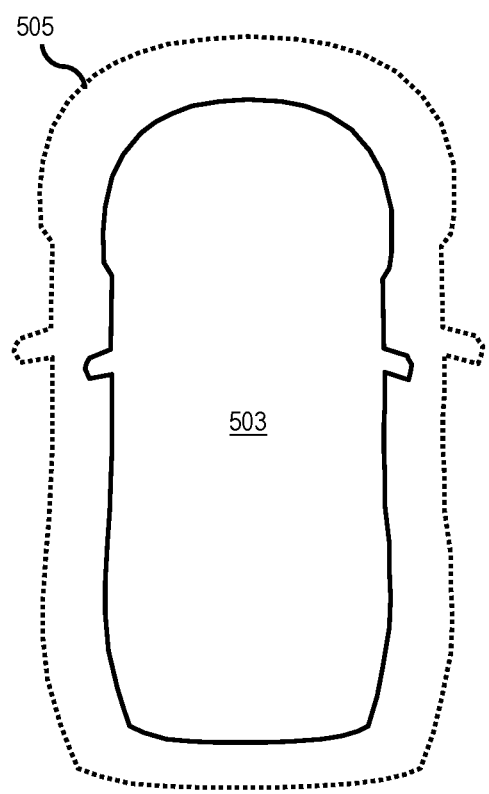
FIG. 5B illustrates a second example virtual zone for an inexperienced driver of the vehicle of FIG. 5A.

FIG. 5A illustrates a first example virtual zone for an experienced driver of a vehicle. In the illustrated example, a first virtual zone 501 surrounds a vehicle 503 and corresponds to an external shape of the vehicle 503. FIG. 5B illustrates a second example virtual zone for an inexperienced driver of the vehicle of FIG. 5A. In the illustrated example, a second virtual zone 505 surrounds the vehicle 501 and corresponds to the external shape of the vehicle 501. The size of the second virtual zone 505 is greater than the size of the first virtual zone 503. As such, if the experienced and inexperienced drivers use the first virtual zone 501 and the second virtual zone 505, respectively, and approach a stationary object with the vehicle 501 at a same speed and at a same starting location, the vehicle 501 would generate an alert for the inexperienced driver sooner than the experienced driver.

In one embodiment, the calculation module 303 tracks a level of familiarity on a vehicle's dimensions and capabilities for each user of the vehicle 105. As time passes and a user of the vehicle does not use the vehicle 105, the calculation module 303 causes the level of familiarity on the vehicle's dimensions and capabilities for the user to decay. As the level of the user's familiarity on the vehicle's dimensions and capabilities decreases, the virtual zone assigned for the user returns to a default virtual zone size. For example, if a user's familiarity on the vehicle's dimensions and capabilities is at a "high" level, the virtual zone assigned for the user gradually increases back to the default size as the amount of time that the user does not use the vehicle 105 increases; whereas if the user's familiarity on the vehicle's dimensions and capabilities is at a "low" level, the virtual zone assigned for the user remains the same or gradually increases as the amount of time that the user does not use the vehicle 105 increases.

In one embodiment, the calculation module 303 alters the virtual zone based on an environment within a cabin of the vehicle 105. For example, the detection module 301 may communicate with image sensors and/or audio recorders available within the vehicle cabin to monitor a level of activity occurring within the vehicle 105. If the detection module 301 receive sensor data indicating that the activity within the cabin of the vehicle 105 is noisy and/or disruptive for the driver, the calculation module 303 may increase the virtual zone. For example, if the detection module 301 determines that the driver is using his/her phone and/or passengers within the vehicle 105 are generating disruptive noises, the calculation module 303 increases the virtual zone.

In one embodiment, the detection module 301 acquires sensor data from image sensors available within the vehicle cabin to monitor a state of a driver operating the vehicle 105. In such embodiment, the calculation module 303 analyses the sensor data to determine: (1) a degree, frequency, and duration at which eyes of the driver close; (2) a degree, frequency, and duration at which an eye angle of the driver deviates from one or more normal eye angles for maneuvering the vehicle 105; and (3) a degree, frequency, and duration at which a head position of the driver deviates from one or more normal head positions for maneuvering the vehicle 105. Based on the analysis, the calculation module 303 determines whether the driver of the vehicle 105 is distracted (e.g., the driver is watching his/her phone) and/or drowsy. If the calculation module 303 determines that the driver is distracted and/or drowsy, the calculation module 303 increases the size of the virtual zone.

In one embodiment, the calculation module 303 alters the virtual zone based on an environment in which the vehicle 105 is located. For example, the detection module 301 may acquire data indicating weather conditions associated with a location in which a driver of the vehicle 105 wishes to execute a parking maneuver. Such data may be acquired from one or more detection entities 113 proximate to the location, the services platform 115, and/or the content provider 119. The calculation module 303 receives the data and determines whether the weather conditions will impact visibility for the driver and operations of proximity sensors of the vehicle 105 (e.g., heavy rain, snow). If so, calculation module 303 decreases the size of the virtual zone. By way of another example, the detection module 301 may acquire data indicating a traffic density associated with a location in which a driver of the vehicle 105 wishes to execute a parking maneuver. Such data may be acquired from one or more detection entities 113 proximate to the location, the services platform 115, and/or the content provider 119. The calculation module 303 receives the data, and based on the data, the calculation module 303 increases the size of the virtual zone for the location as a level of traffic density associated with the location increases and decreases increases the size of the virtual zone as the level of traffic density associated with the location decreases. In one embodiment, the detection module 301 may acquire data indicating a number of vehicle accidents that has occurred within the location from one or more detection entities 113 proximate to the location, the services platform 115, and/or the content provider 119. In such embodiment, the calculation module 303 analyses the data and increases the size of the virtual zone as the number of vehicle accidents that has occurred within the location increases. In one embodiment, the calculation module 303 dynamically adjusts the size of the virtual zone based on temporal data indicating time and date. Specifically, the calculation module 303 uses the temporal data to derive a sun angle with respect to a location of the vehicle 105. As the sun angle transitions to indicate daytime at the location of the vehicle 105, the calculation module 303 decreases the size of the virtual zone, and as the sun angle transitions to indicate night-time at the location of the vehicle 105, the calculation module 303 increases the size of the virtual zone.

In one embodiment, the calculation module 303 employs a machine learning model to output a suitable virtual zone for a driver using a parking assistance feature. The machine learning model may be trained based on historical data indicating events in which drivers executed parking maneuvers to park vehicles. The historical data may indicate: (1) vehicle attribute data indicating attributes of the vehicles; (2) environmental conditions associated with locations in which the drivers executed the parking maneuvers; (3) driver attribute data associated with the drivers; or (4) a combination thereof. In such example, the vehicle attribute data may indicate attributes of said vehicles, types of proximity sensors equipped by the said vehicles, orientations of the proximity sensors, etc. The environmental condition data may indicate weather conditions associated with the locations of the events, parking density information associated with said location, types of parking space that define the location, dimensions of the parking space, etc. The driver attribute data may indicate driving experience information associated with the drivers. The driving experience information may indicate: (1) overall durations in which the drivers used the vehicles; (2) a number of instances in which the drivers have used the vehicles to perform the parking maneuvers; (3) a number of instances in which the drivers used the vehicles to park in parking spaces; (4) an average number of attempts executed by one of the drivers to park one of the vehicles in one of the parking spaces; or (5) a combination thereof. In one embodiment, the machine learning model uses the historical data to learn minimum clearances needed to successfully park the vehicles into the parking spaces. In such embodiment, the machine learning model uses the minimum clearance to define a virtual zone for a given driver. For example, the machine learning model may learn from the historical data that drivers having an average of 40 percent rate for successfully executing a parking maneuver for a parallel parking spot require an average of 30 cm minimum clearance to successfully park. By way of another example, the machine learning model may learn from the historical data that drivers that have used a sedan for at least 6 months require an average of 40 cm minimum clearance to successfully park. Once the machine learning model is trained, the calculation module 303 may receive a request to render a virtual zone for a driver of the vehicle 105. To render the virtual zone, the detection module 301 acquires: (1) vehicle attribute data associated with the vehicle 105; (2) environmental condition data indicating environmental conditions associated with a location in which the driver wishes to park the vehicle 105; (3) driver attribute data associated with the driver; or (4) a combination thereof. The calculation module 303 compares acquired data to historical data to identify corresponding elements. For example, the detection module 301 may acquire data indicating that the driver has used the vehicle 105 for 3 months. The machine learning model compares such data to the historical data and identify events in which drivers have used vehicles similar to the vehicle 105 for 3 months. Once the events are identified, the machine learning model determines a minimum clearance needed for each of the vehicles, as identified in the events, to successfully park and uses an average of all the minimum clearances needed for the vehicles to successfully park to determine the virtual zone. In one embodiment, the machine learning model accounts for dimensions of the parking spot to predict a virtual zone for a driver. For example, the machine learning model may learn from the historical data that drivers having an experience for driving a vehicle for 6 months have a 50 percent chance of successfully parking in a perpendicular parking spot having a 2.4-meter parking width. The machine learning model may further learn that such drivers required require an average of 30 cm clearance to successfully park. As such, when the machine learning model renders a virtual zone for a driver that also has an average of 50 percent rate for successfully executing a parking maneuver for a perpendicular parking spot having a 2.4-meter parking width, the machine learning model sets the virtual zone for the driver's vehicle as 30 cm.

In one embodiment, the calculation module 303 may determine a shape of the virtual zone for a driver using the parking assistance feature. The shape of the virtual zone is limited based on: (1) a number of proximity sensors available within the vehicle 105; (2) a relative position of each proximity sensor with respect to the vehicle 105; and (3) an orientation of each proximity sensor. In one embodiment, the shape of the virtual zone corresponds to an outline of the vehicle 105 at a plan view, and the center of the virtual zone aligns with the center of the vehicle 105. In one embodiment, the calculation module 303 generates the shape of the virtual zone based on attributes of a vehicle. For example, for a vehicle having a driver seat on the left side of the vehicle, calculation module 303 generates the shape of the virtual zone such that the width of the virtual zone at the right side of the vehicle is greater than the width of the virtual zone at the left side of the vehicle; whereas for a vehicle having a driver seat on the right side of the vehicle, the calculation module 303 generates the virtual zone such that the width of the virtual zone at the left side of the vehicle is greater than the width of the virtual zone at the right side of the vehicle.

The notification module 307 may cause a notification on the UE 101 and/or one or more other UEs associated with the vehicle 105. The notification may indicate: (1) a virtual zone; (2) an experience level associated with a driver in relation to the size of the virtual zone; (3) one or more sides of the virtual zone that is abutting an object while the vehicle 105 is parking; (4) one or more parking maneuver recommendations; or (5) a combination thereof. The notification may include sound notification, display notification, vibration, or a combination thereof.

Figure 6:
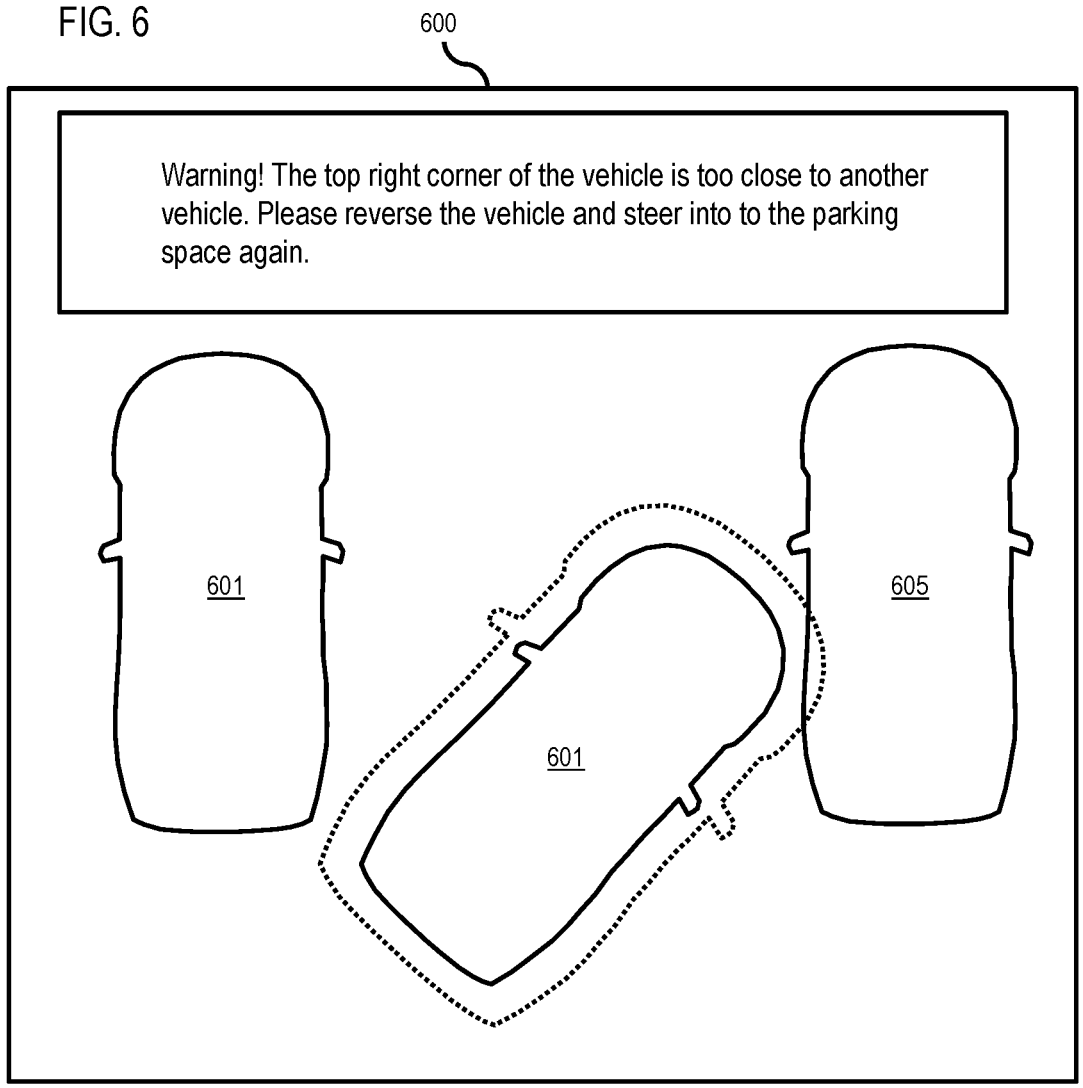
FIG. 6 illustrates an example visual representation of a plan view of a vehicle and an environment of the vehicle while the vehicle is executing a parking maneuver.

The presentation module 309 obtains a set of information, data, and/or calculated results from other modules, and continues with providing a visual representation to the UE 101 and/or any other user interface associated with the vehicle 105 and/or one or more vehicles proximate to the vehicle 105. The visual representation may indicate any of the information presented by the notification module 307. For example, FIG. 6 illustrates an example visual representation 600 of a plan view of a vehicle and an environment of the vehicle while the vehicle is executing a parking maneuver. In the illustrated example, a vehicle 601 is attempting to execute a perpendicular parking maneuver. Using a virtual zone 603 of the vehicle 601, the detection module 301 and the calculation module 303 has determined that the vehicle is too close to one of the parked vehicles 605 and 607. As such, the presentation module 309 generates a message 311 stating "WARNING! THE TOP RIGHT CORNER OF THE VEHICLE IS TOO CLOSE TO ANOTHER VEHICLE. PLEASE REVERSE THE VEHICLE AND STEER INTO TO THE PARKING SPACE AGAIN."

The above presented modules and components of the parking assistance platform 123 can be implemented in hardware, firmware, software, or a combination thereof. Though depicted as a separate entity in FIG. 3, it is contemplated that the parking assistance platform 123 may be implemented for direct operation by the UE 101, the vehicle 105, the services platform 115, one or more of the content providers 119, or a combination thereof. As such, the parking assistance platform 123 may generate direct signal inputs by way of the operating system of the UE 101, the vehicle 105, the services platform 115, the one or more of the content providers 119, or the combination thereof for interacting with the applications 103. The various executions presented herein contemplate any and all arrangements and models.

Figure 7:
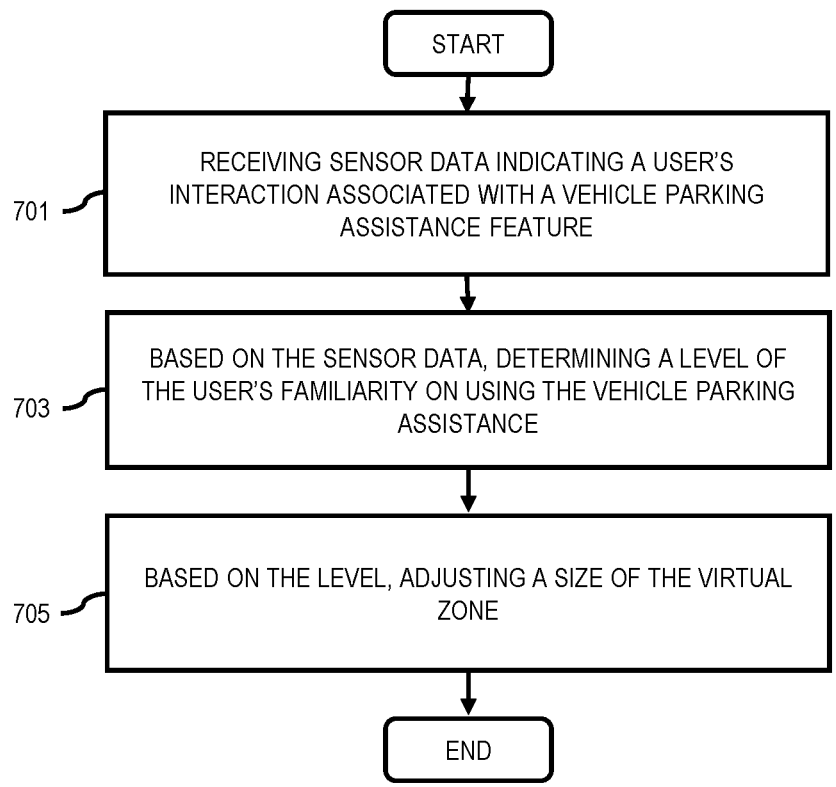
FIG. 7 illustrates a flowchart of a process for providing adaptive vehicle parking assistance.
Figure 9:
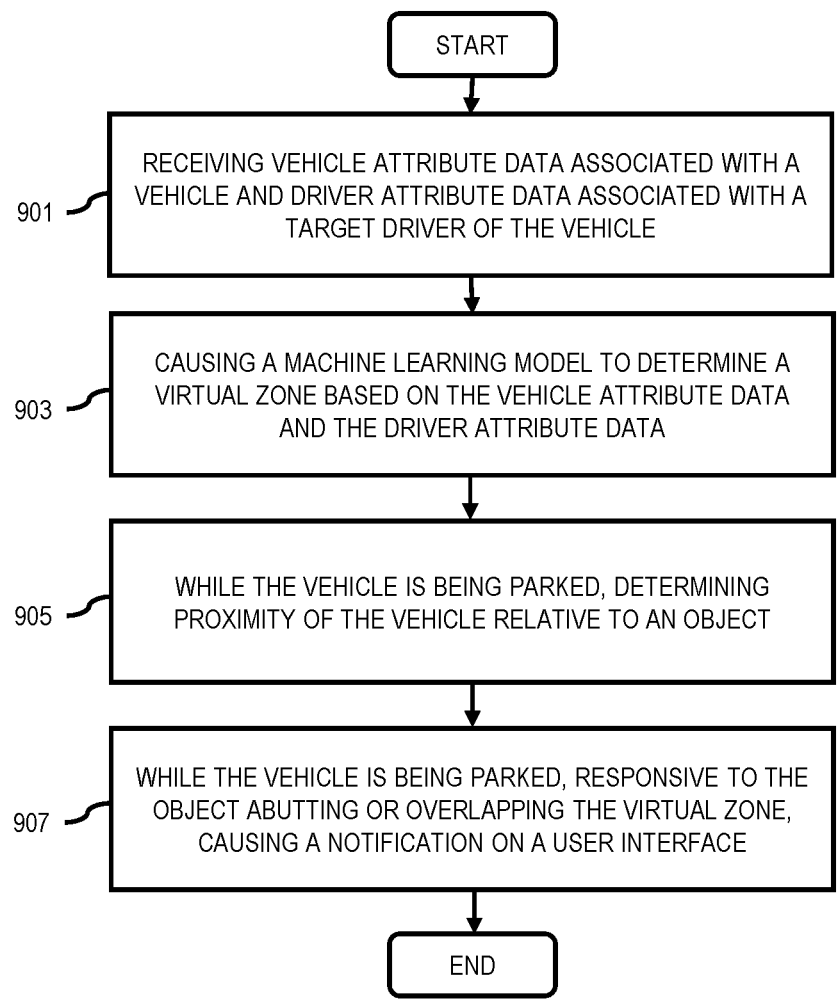
FIG. 9 illustrates a flowchart of a process for using a machine learning model to provide adaptive vehicle parking assistance.

FIG. 7 is a flowchart of a process 700 for providing adaptive vehicle parking assistance, according to one embodiment. In one embodiment, the parking assistance platform 123 performs the process 700 and is implemented in, for instance, a chip set including a processor and a memory as shown in FIG. 9.

In step 701, the parking assistance platform 123 receives sensor data indicating a user's interaction associated with a vehicle parking assistance feature. The parking assistance feature is a feature in which the vehicle causes a notification on a user interface in response to an object abutting or overlapping the virtual zone. The sensor data may indicate: (1) a speed at which a driver of the vehicle executes a parking maneuver for the vehicle; (2) a period in which the driver executes the parking maneuver; (3) one or more timings in which the vehicle accelerates while the driver executes the parking maneuver; (4) one or more timings in which the vehicle slows down while the driver executes the parking maneuver; (5) a facial expression of the driver during the parking maneuver; (6) a number and duration of the driver's head movements during and after the parking maneuver; (7) a duration or frequency at which the driver uses the vehicle; (8) a duration or frequency at which the driver uses the vehicle parking assistance feature for parking the vehicle; or (9) a combination thereof.

In step 703, the parking assistance platform 123 determines a level of the user's familiarity on using the vehicle parking assistance feature based on the sensor data. For example, if the sensor data indicates that the user smoothly parks a vehicle into a parking space with a single maneuver while using the parking assistance feature, the parking assistance platform 123 may rate the level of the user's familiarity on using the vehicle parking assistance feature as a "high" level.

In step 705, the parking assistance platform 123 adjusts a size of the virtual zone based on the level. For example, if the level of the user's familiarity on using the vehicle parking assistance feature is at a "high" level, the parking assistance platform 123 decreases the size of the virtual zone, thereby ensuring that a vehicle user interface does not frequently cause a notification to the user while the user is executing a parking maneuver.

Figure 8:
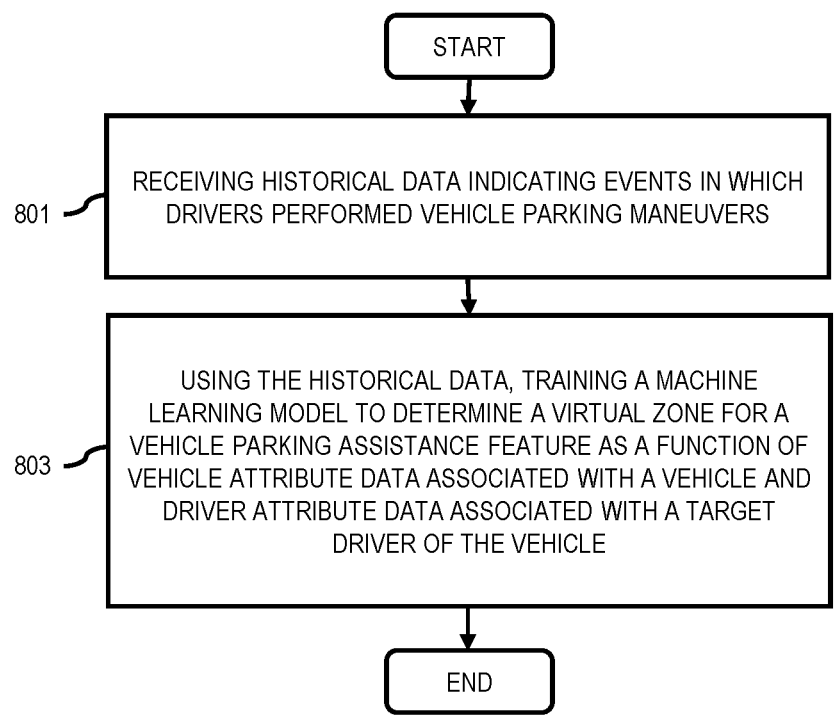
FIG. 8 illustrates a flowchart of a process for training a machine learning model to provide adaptive vehicle parking assistance.

FIG. 8 is a flowchart of a process 800 for training a machine learning model to provide adaptive vehicle parking assistance, according to one embodiment. In one embodiment, the parking assistance platform 123 performs the process 800 and is implemented in, for instance, a chip set including a processor and a memory as shown in FIG. 9.

In step 801, the parking assistance platform 123 receives historical data indicating events in which drivers performed vehicle parking maneuvers. The historical data may indicate: (1) vehicle attribute data indicating attributes of vehicles used by the drivers for executing the vehicle parking maneuvers; (2) environmental conditions associated with locations in which the drivers executed the parking maneuvers; (3) driver attribute data associated with the drivers; or (4) a combination thereof. The vehicle attribute data may indicate dimensions of the vehicles. The environmental conditions may indicate weather conditions, attributes of parking spaces, physical objects nearby the parking spaces, etc. The driver attribute data may indicate the driver's past experience for maneuvering vehicles.

In step 803, the parking assistance platform 123 uses the historical data to train a machine learning model to determine a virtual zone for a vehicle parking assistance feature as a function of vehicle attribute data associated with a vehicle and driver attribute data associated with a target driver of the vehicle.

FIG. 9 is a flowchart of a process 900 for using a machine learning model to provide adaptive vehicle parking assistance, according to one embodiment. In one embodiment, the parking assistance platform 123 performs the process 800 and is implemented in, for instance, a chip set including a processor and a memory as shown in FIG. 9.

In step 901, the parking assistance platform 123 receives vehicle attribute data associated with a vehicle and driver attribute data associated with a target driver of the vehicle. The vehicle attribute data indicates, for example, dimensions of the vehicle, and the driver attribute data indicates the target driver's experience for maneuvering the vehicle and/or one or more other vehicles similar to the vehicle.

In step 903, the parking assistance platform 123 causes a machine learning model to determine a virtual zone based on the vehicle attribute data and the driver attribute data. For example, the machine learning model may correlate the vehicle attribute data and the driver attribute data to historical data including past events in which drivers have executed parking maneuvers. The machine learning model may identify one or more of the past events that correspond to the vehicle attribute data and the driver attribute data and identifies one or more minimum clearances required by one or more vehicles associated with said events. The machine learning model may use said minimum clearances of said events to determine the virtual zone.

In step 905, the parking assistance platform 123 determines proximity of the vehicle relative to an object while the vehicle is being parked. The parking assistance platform 123 determines such information by receiving proximity sensors equipped by the vehicle while the vehicle is being parked.

In step 907, the parking assistance platform 123 causes a notification on a user interface in response to the object abutting or overlapping the virtual zone while the vehicle is being parked. The user interface may be equipped within the vehicle, or the user interface may be a UE associated with the target driver.

The system, apparatus, and methods described herein enable a vehicle to provide an adaptive vehicle parking assistance based on a user's level of familiarity on a vehicle's dimensions and capabilities. As such, inexperienced drivers and/or drivers that are unfamiliar with the vehicle parking assistance feature may frequently receive notifications for aiding the drivers while the drivers are executing parking maneuvers, whereas experienced drivers and/or drivers that are familiar with the vehicle parking assistance feature are less frequently disturbed with notifications while the drivers are executing parking maneuvers.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
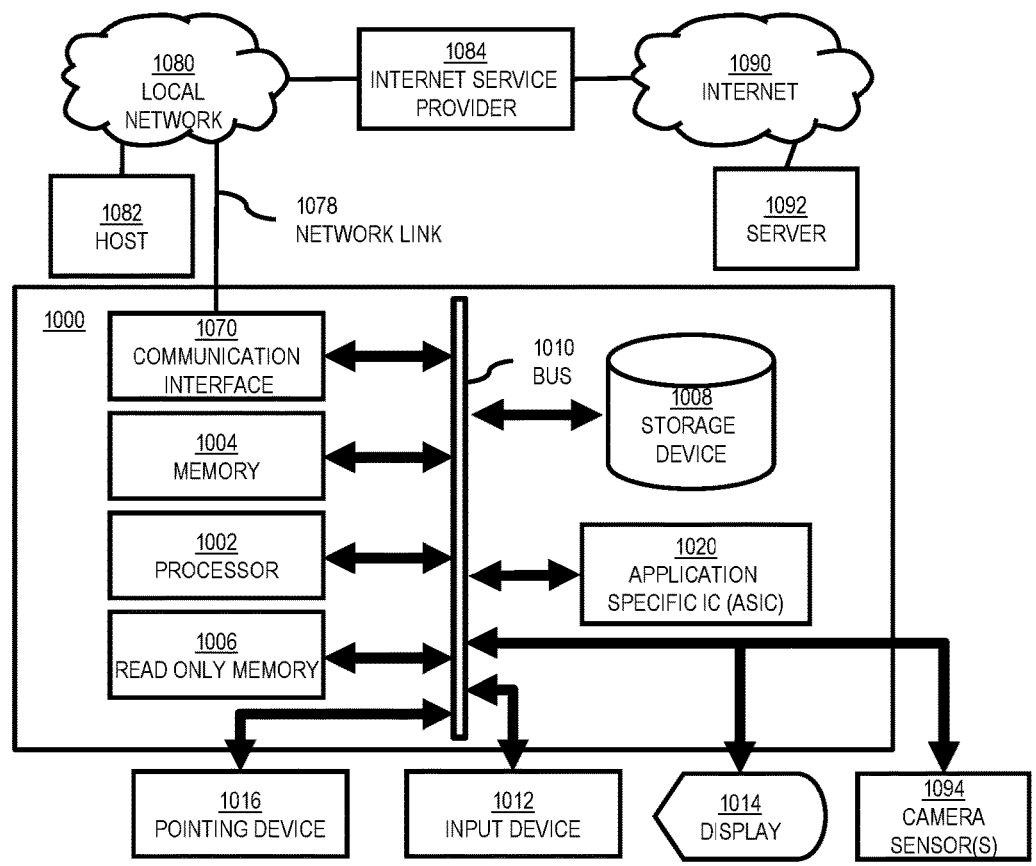
FIG. 10 illustrates a computer system upon which an embodiment may be implemented.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide adaptive vehicle parking assistance as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing adaptive vehicle parking assistance.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing adaptive vehicle parking assistance. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for providing adaptive vehicle parking assistance. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing adaptive vehicle parking assistance, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 121 for providing adaptive vehicle parking assistance to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1082 connected to the Internet hosts a process that provides a service in response to information received over the Internet. For example, server host 1082 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1082 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
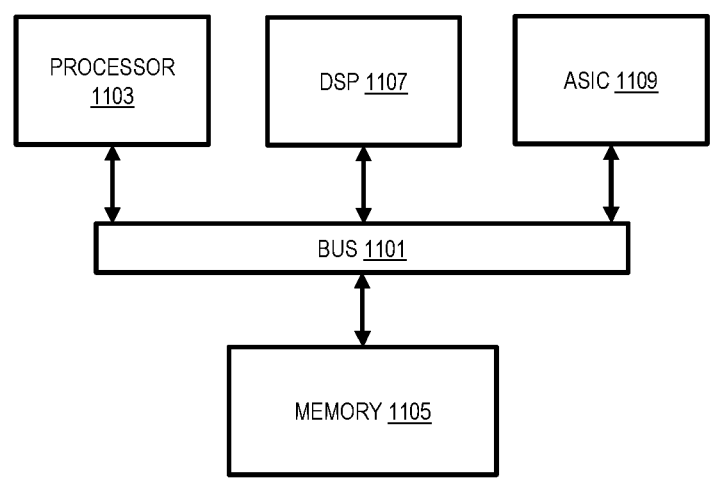
FIG. 11 illustrates a chip set or chip upon which an embodiment may be implemented.

FIG. 11 illustrates a chip set or chip 1100 upon which an embodiment of the invention may be implemented. Chip set 1100 is programmed to provide adaptive vehicle parking assistance as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing adaptive vehicle parking assistance.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real-time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors. The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide adaptive vehicle parking assistance. The memory 1105 also stores the data associated with or generated by the execution of the inventive steps.

FIG. 12 is a diagram of exemplary components of a mobile terminal 1201 (e.g., a mobile device or vehicle or part thereof) for communications, which is capable of operating in the system of FIG. 1, according to one embodiment. In some embodiments, mobile terminal 1201, or a portion thereof, constitutes a means for performing one or more steps of providing adaptive vehicle parking assistance. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing adaptive vehicle parking assistance. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide adaptive vehicle parking assistance. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1149 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:

receive sensor data indicating a user's interaction associated with a vehicle parking assistance feature, wherein the vehicle parking assistance feature is a feature in which a vehicle causes a notification on a user interface in response to an object abutting or overlapping a virtual zone surrounding the vehicle, and wherein the virtual zone is created by at least one vehicle processor of the vehicle;

based on the sensor data, determine a level of the user's familiarity on using the vehicle parking assistance feature; and based on the level, adjust a size of the virtual zone.

2. The apparatus of claim 1, wherein the sensor data indicate: (i) a speed at which a driver of the vehicle executes a parking maneuver for the vehicle; (ii) a period in which the driver executes the parking maneuver; (iii) one or more first timings in which the vehicle accelerates while the driver executes the parking maneuver; (iv) one or more second timings in which the vehicle slows down while the driver executes the parking maneuver; (v) a facial expression of the driver during the parking maneuver; (vi) a number and durations of the driver's head movements during and after the parking maneuver; (vii) a first duration or frequency at which the driver uses the vehicle; (viii) a second duration or frequency at which the driver uses the vehicle parking assistance feature for parking the vehicle; or (viv) a combination thereof.

3. The apparatus of claim 1, wherein the sensor data are first sensor data, and wherein the computer program code instructions are configured to, when executed, cause the apparatus to:

receive second sensor data indicating an environment of an interior cabin of the vehicle;

based on the second sensor data, determine a level of distraction for a driver within the vehicle; and based on the level of distraction, adjust the size of the virtual zone.

4. The apparatus of claim 3, wherein the second sensor data indicate: (i) a first degree, frequency, and duration at which eyes of the driver close; (ii) a second degree, frequency, and duration at which an eye angle of the driver deviates from one or more normal eye angles for maneuvering the vehicle; (iii) a third degree, frequency, and duration at which a head position of the driver deviates from one or more normal head positions for maneuvering the vehicle; (vi) a level of noise within the vehicle cabin; (vii) a user usage of a mobile device; or (vii) a combination thereof.

5. The apparatus of claim 1, wherein the sensor data are first sensor data, and wherein the computer program code instructions are configured to, when executed, cause the apparatus to, responsive to receiving second sensor data indicating that the vehicle has contacted the object while a driver of the vehicle was executing a parking maneuver, increase the size of the virtual zone.

6. The apparatus of claim 1, wherein the sensor data are first sensor data, and wherein the computer program code instructions are configured to, when executed, cause the apparatus to:

receive second sensor data indicating a weather condition of an environment in which the vehicle is located; and responsive to the second sensor data indicating that the weather condition impacts visibility for a driver of the vehicle, increase the size of the virtual zone.

7. The apparatus of claim 1, wherein the computer program code instructions are configured to, when executed, cause the apparatus to:

receive historical data associated with a location of the vehicle;

based on the historical data, determine a frequency in which vehicle accidents have occurred within the location; and based on the frequency, adjust the size of the virtual zone.

8. The apparatus of claim 1, wherein the computer program code instructions are configured to, when executed, cause the apparatus to:

determine a time of day in which the vehicle parking assistance feature is used;

responsive to the time being daytime, adjust the size of the virtual zone to a first size; and responsive to the time being night-time, adjust the size of the virtual zone to a second greater size.

9. A non-transitory computer-readable storage medium having computer program code instructions stored therein, the computer program code instructions, when executed by at least one processor, cause the at least one processor to:

receive historical data indicating events in which drivers performed vehicle parking maneuvers;

using the historical data, train a machine learning model to adjust a virtual zone for a vehicle parking assistance feature as a function of vehicle attribute data associated with a vehicle and driver attribute data associated with a target driver of the vehicle, wherein the virtual zone surrounds the vehicle and is created by at least one vehicle processor of the vehicle, and wherein the vehicle parking assistance feature is a feature in which the vehicle causes a notification on a user interface in response to an object abutting or overlapping the virtual zone.

10. The non-transitory computer-readable storage medium of claim 9, wherein the vehicle attribute data are first vehicle attribute data, wherein the vehicle is a first vehicle, wherein the driver attribute data are first driver attribute data, and wherein the historical data indicate: (i) second vehicle attribute data associated with second vehicles used by the drivers to perform the vehicle parking maneuvers; (ii) environmental conditions in which the drivers performed the vehicle parking maneuvers; and (iii) second driver attribute data associated with the drivers.

11. The non-transitory computer-readable storage medium of claim 10, wherein the second vehicle attribute data indicate dimensions of the second vehicles.

12. The non-transitory computer-readable storage medium of claim 10, wherein the environmental conditions indicate: (i) weather conditions in which the vehicle parking maneuvers occurred; (ii) dimensions of parking spaces in which the second vehicles parked; (iii) types of parking spaces in which the second vehicles parked; or (iv) a combination thereof.

13. The non-transitory computer-readable storage medium of claim 10, wherein the second driver attribute data indicate a parking experience of the drivers, wherein the parking experience is defined at least in part by: (i) durations in which the drivers used the second vehicles; (ii) a first number of instances in which the drivers used the second vehicles to perform the parking maneuvers; (iii) a second number of instances in which the drivers used the second vehicles to park in parking spaces; (iv) an average number of attempts executed by the drivers to park the second vehicles in the parking spaces; or (v) a combination thereof.

14. The non-transitory computer-readable storage medium of claim 10, wherein, to train the machine learning model to determine the virtual zone, the computer program code instructions, when executed by at least one processor, cause the at least one processor to:

identify one or more of the second vehicle attribute data corresponding to the first vehicle attribute data;

identify one or more of the second driver attribute data corresponding to the first driver attribute data;

identify one or more of the events corresponding to the one or more of the second vehicle attribute data and the one or more of the second driver attribute data;

for each of the one or more of the events, identify a minimum clearance needed to execute a successful vehicle parking maneuver; and determine the virtual zone based at least in part of the minimum clearance.

15. A method of providing vehicle parking assistance, the method comprising:

receiving vehicle attribute data associated with a vehicle and driver attribute data associated with a target driver of the vehicle; and causing a machine learning model to adjust a virtual zone based on the vehicle attribute data and the driver attribute data, wherein the virtual zone surrounds the vehicle and is created by at least one vehicle processor of the vehicle, and wherein the machine learning model is trained to generate the virtual zone based on historical data indicating events in which drivers performed vehicle parking maneuvers; and while the vehicle is being parked:

determining proximity of the vehicle relative to an object; and responsive to the object abutting or overlapping the virtual zone, causing a notification on a user interface.

16. The method of claim 15, wherein the vehicle attribute data are first vehicle attribute data, wherein the vehicle is a first vehicle, wherein the driver attribute data are first driver attribute data, and wherein the historical data indicate: (i) second vehicle attribute data associated with second vehicles used by the drivers to perform the vehicle parking maneuvers; (ii) environmental conditions in which the drivers performed the vehicle parking maneuvers; and (iii) second driver attribute data associated with the drivers.

17. The method of claim 16, wherein the second vehicle attribute data indicate dimensions of the second vehicles.

18. The method of claim 16, wherein the environmental conditions indicate: (i) weather conditions in which the vehicle parking maneuvers occurred; (ii) dimensions of parking spaces in which the second vehicles parked; (iii) types of parking spaces in which the second vehicles parked; or (iv) a combination thereof.

19. The method of claim 16, wherein the second driver attribute data indicate parking experience of the drivers, wherein the parking experience is defined at least in part by: (i) durations in which the drivers used the second vehicles; (ii) a first number of instances in which the drivers used the second vehicles to perform the parking maneuvers; (iii) a second number of instances in which the drivers used the second vehicles to park in parking spaces; (iv) an average number of attempts executed by the drivers to park the second vehicles in the parking spaces; or (v) a combination thereof.

20. The method of claim 16, wherein the causing the machine learning model to determine the virtual zone comprises causing the machine learning model to:

identify one or more of the second vehicle attribute data corresponding to the first vehicle attribute data;

identify one or more of the second driver attribute data corresponding to the first driver attribute data;

identify one or more of the events corresponding to the one or more of the second vehicle attribute data and the one or more of the second driver attribute data;

for each of the one or more of the events, identify a minimum clearance needed to execute a vehicle parking maneuver; and determine the virtual zone based at least in part of the minimum clearance.

\* \* \* \* \*